United States Patent
Suzuki et al.

(10) Patent No.: US 10,597,009 B2
(45) Date of Patent: Mar. 24, 2020

(54) ROAD SURFACE CONDITION ESTIMATION DEVICE

(71) Applicant: DENSO CORPORATION, Kariya, Aichi-pref. (JP)

(72) Inventors: Youichirou Suzuki, Nisshin (JP); Akira Takaoka, Nisshin (JP); Takatoshi Sekizawa, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 144 days.

(21) Appl. No.: 15/770,517

(22) PCT Filed: Sep. 23, 2016

(86) PCT No.: PCT/JP2016/078021
§ 371 (c)(1),
(2) Date: Apr. 24, 2018

(87) PCT Pub. No.: WO2017/073210
PCT Pub. Date: May 4, 2017

(65) Prior Publication Data
US 2018/0222458 A1    Aug. 9, 2018

(30) Foreign Application Priority Data

Oct. 27, 2015 (JP) ................. 2015-210984

(51) Int. Cl.
*G01W 1/00*       (2006.01)
*B60W 40/068*  (2012.01)
(Continued)

(52) U.S. Cl.
CPC ............ *B60T 8/1725* (2013.01); *B60T 8/171* (2013.01); *B60T 8/1763* (2013.01);
(Continued)

(58) Field of Classification Search
CPC ....... B60W 40/068; G01W 1/00; G01W 1/02; B60T 8/171; B60T 8/1725; B60T 8/1763;
(Continued)

(56) References Cited

U.S. PATENT DOCUMENTS 7,620,504 B2 * 11/2009 Ogawa ................ B60W 40/068
                                                              701/70
9,037,376 B2 *  5/2015 Ogawa .................... B60T 8/172
                                                              701/80
(Continued)

FOREIGN PATENT DOCUMENTS

JP    2005306160 A    11/2005
JP    2011242303 A    12/2011
(Continued)

*Primary Examiner* — Jacques M Saint Surin
(74) *Attorney, Agent, or Firm* — Harness, Dickey & Pierce, P.L.C.

(57) ABSTRACT

A road surface condition estimation device extracts a detection signal of a vibration power generation element during a ground contact section to detect a road surface condition. A threshold used for determination of the ground contact section is variable according to a traveling speed of a vehicle. As a result, even if a pulse level of an output voltage of the vibration power generation element changes according to the traveling speed of the vehicle, the threshold corresponding to the change can be set. The ground contact section is determined with the use of the above thresholds, thereby being capable of performing the determination with high accuracy. Therefore, the road surface condition can be detected with high accuracy based on the ground contact section determined with high accuracy.

8 Claims, 10 Drawing Sheets

(51) Int. Cl.
    *B60T 8/171*     (2006.01)
    *B60T 8/1763*    (2006.01)
    *G01M 17/02*     (2006.01)
    *G01W 1/02*      (2006.01)
    *B60T 8/172*     (2006.01)

(52) U.S. Cl.
    CPC ........ *B60W 40/068* (2013.01); *G01M 17/025* (2013.01); *G01W 1/00* (2013.01); *G01W 1/02* (2013.01); *B60T 2210/10* (2013.01); *B60T 2240/03* (2013.01)

(58) Field of Classification Search
    CPC ............ B60T 2210/10; B60T 2240/03; G01M 17/025
    USPC .......................................................... 73/660
    See application file for complete search history.

(56) References Cited

U.S. PATENT DOCUMENTS

| | | | |
|---|---|---|---|
| 10,099,699 B2* | 10/2018 | Suzuki | B60W 40/06 |
| 10,352,827 B2* | 7/2019 | Kato | G01L 17/00 |
| 2002/0162389 A1* | 11/2002 | Yokota | B60C 23/06 |
| | | | 73/146 |
| 2005/0188754 A1* | 9/2005 | Ogawa | B60T 8/1725 |
| | | | 73/146 |
| 2013/0116972 A1 | 5/2013 | Hanatsuka et al. | |
| 2016/0368501 A1 | 12/2016 | Suzuki et al. | |
| 2019/0120721 A1* | 4/2019 | Suzuki | G07C 5/02 |

FOREIGN PATENT DOCUMENTS

| | | |
|---|---|---|
| JP | 2015174637 A | 10/2015 |
| WO | WO-2017073211 A1 | 5/2017 |

* cited by examiner

ROAD SURFACE CONDITION ESTIMATION DEVICE

CROSS REFERENCE TO RELATED APPLICATIONS

This application is a U.S. National Phase Application under 35 U.S.C. 371 of International Application No. PCT/JP2016/078021 filed on Sep. 23, 2016 and published in Japanese as WO 2017/073210 A1 on May 4, 2017. This application is based on and claims the benefit of priority from Japanese Patent Application No. 2015-210984 filed on Oct. 27, 2015. The entire disclosures of all of the above applications are incorporated herein by reference.

TECHNICAL FIELD

The present disclosure relates to a road surface condition estimation device that estimates a road surface condition based on vibrations to which tires are subjected.

BACKGROUND ART

Up to now, a technique in which an acceleration sensor is buried in a back surface of a tire tread, and a road surface condition, for example, a condition of an asphalt road, a snowy road, or an frozen road, is estimated on the basis on a detection signal of the acceleration sensor has been proposed (for example, refer to Patent Literature 1). Specifically, in the case where the acceleration sensor is buried in the back surface of the tire tread, when a portion of the tire tread corresponding to a placement location in which the acceleration sensor is disposed contacts a road surface in association with the rotation of the tire, a vibration component corresponding to the road surface condition is superimposed on a detection signal of the acceleration sensor. For that reason, up to now, a frequency component of the vibration in a ground contact section where the portion of the tire tread corresponding to the placement location of the acceleration sensor contacts the road surface is analyzed to estimate the road surface condition.

PRIOR ART LITERATURES

Patent Literature

Patent Literature 1: JP 2011-242303 A

SUMMARY OF INVENTION

A level (hereinafter referred to as "pulse level") of a pulse waveform of the vibration detected by the acceleration sensor greatly varies depending on a traveling speed. For that reason, the ground contact section in which the portion of the tire tread corresponding to the placement location of the acceleration sensor contacts the road surface is not determined based on the pulse level with high precision, and the estimation of the road surface condition cannot be performed accurately.

The present disclosure aims at providing a road surface condition estimation device capable of accurately performing determination of a ground contact section where a portion of a tire corresponding to a location of a vibration detection unit for detecting vibration of the tire is in contact with a road surface.

In one aspect of the present disclosure, a road surface condition estimation device includes a tire side device and a vehicle side device. The tire side device includes a vibration detection unit which is attached to a rear surface of a tread of a tire provided in the vehicle and which outputs a detection signal corresponding to a magnitude of vibration of the tire, a signal processing unit having a section identification unit which identifies a ground contact section in which a portion of the tread corresponding to a placement location of the vibration detection unit contacts the road during one rotation of the tire, and a level calculation unit which calculates a level of a high frequency component of the detection signal in the ground contact section, and a transmitter which transmits a calculation result of the level of the high frequency component as road surface condition data representing a road surface condition. Further, the vehicle side device includes a receiver that receives the road surface condition data transmitted from the transmitter, and a road surface condition estimation unit that estimates a road surface condition of a traveling road surface of the tire based on the road surface condition data. Further, in the tire side device, the section identification unit includes a threshold setting unit that sets, according to a traveling speed of the vehicle, a first threshold and a second threshold for comparison with a pulse level of a pulse waveform indicated by the detection signal, the second threshold being smaller than the first threshold, and a section extraction unit that extracts a period between a ground contact start time to a ground contact end time as a ground contact section, the ground contact start time being defined as a next maximum value of the pulse waveform indicated by the detection signal after the pulse waveform becomes larger than the first threshold, and the ground contact end time being defined as a next minimum value of the pulse waveform after the pulse waveform becomes smaller than the second threshold.

As described above, in order to detect the road surface condition, the detection signal from the vibration detection unit that is in the ground contact section is extracted. The first threshold and the second threshold used for determination that the vibration detection unit is in the ground contact section are variable according to the traveling speed of the vehicle. As a result, even if the pulse level of the output voltage of the vibration detection unit changes according to the traveling speed of the vehicle, the threshold corresponding to the change can be set. The ground contact section is determined with the use of the above thresholds, thereby being capable of performing the determination with high accuracy. Therefore, the road surface condition can be detected with high accuracy based on the ground contact section determined with high accuracy.

DESCRIPTION OF EMBODIMENTS

Embodiments of the present disclosure will be described below with reference to the accompanying drawings. In the following respective embodiments, parts identical with or equivalent to each other are denoted by the same symbols for description.

First Embodiment

A road surface condition estimation device according to the present embodiment will be described with reference to FIGS. 1 to 8. The road surface condition estimation device according to the present embodiment is used to estimate a road surface condition during traveling based on vibration on a ground contact surface of a tire provided in each wheel of a vehicle.

Figure 1:
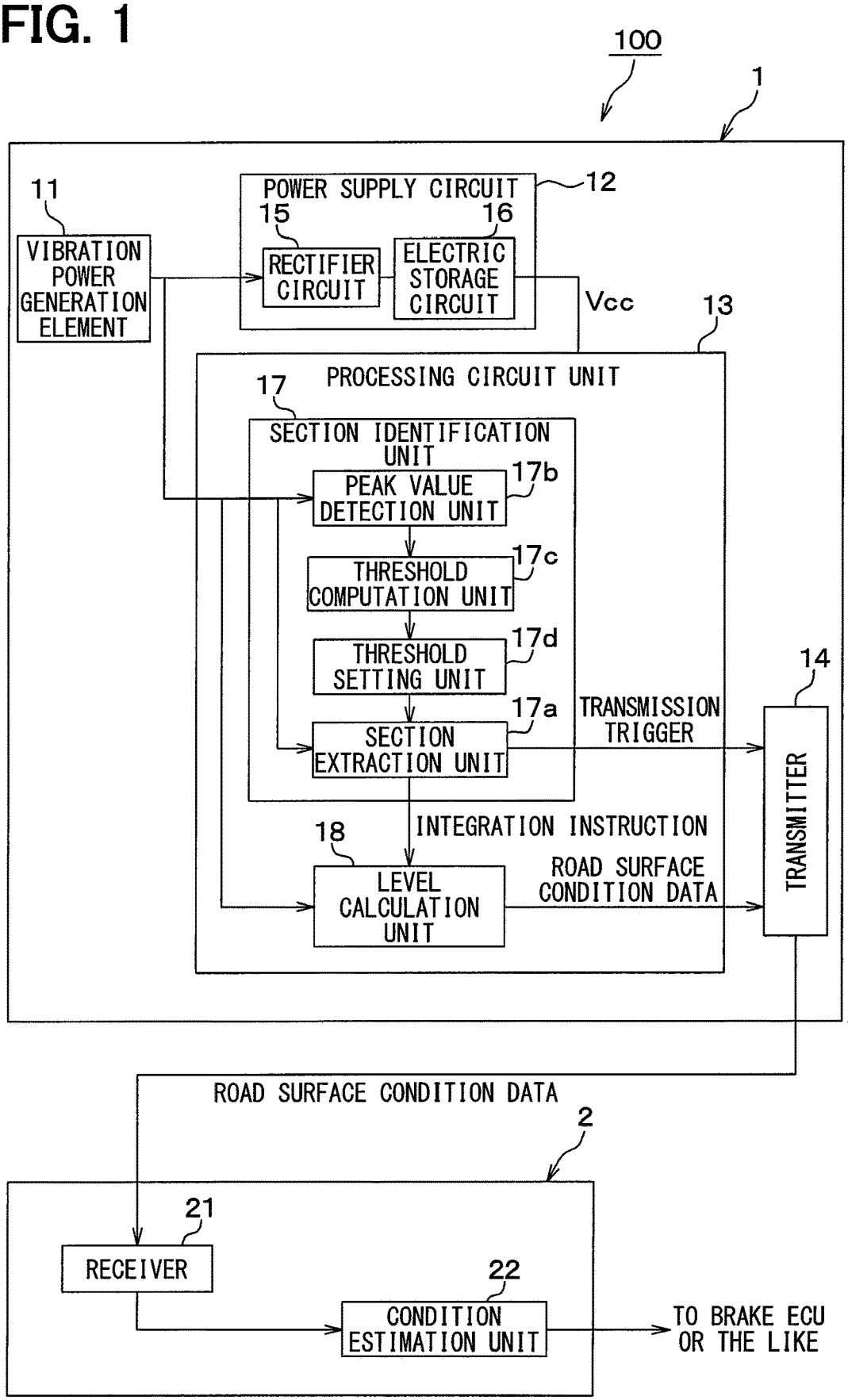
FIG. 1 is a diagram illustrating an overall block configuration of a road surface condition estimation device according to a first embodiment.

As illustrated in FIG. 1, a road surface condition estimation device 100 includes a tire side device 1 provided on a tire side and a vehicle side device 2 provided on a vehicle body side. The road surface condition estimation device 100 transmits data indicative of a road surface condition during traveling from the tire side device 1, the vehicle side device 2 receives the data transmitted from the tire side device 1, and estimates the road surface condition during traveling based on the data. Specifically, the tire side device 1 and the vehicle side device 2 are configured as follows.

Figure 2:
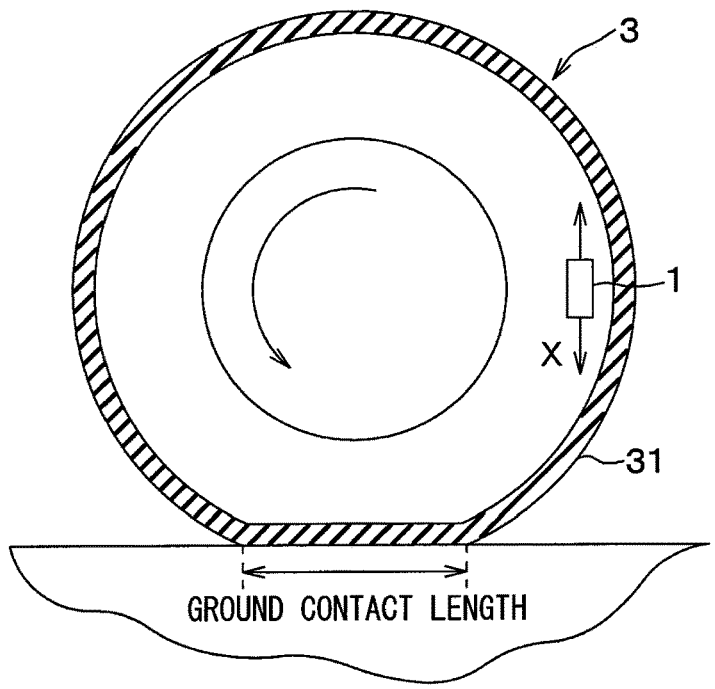
FIG. 2 is a schematic cross-sectional view of a tire to which a tire side device is attached.

As illustrated in FIG. 1, the tire side device 1 includes a vibration power generation element 11, a power supply circuit 12, a processing circuit unit 13, and a transmitter 14. As illustrated in FIG. 2, the tire side device 1 is disposed on a back surface side of a tread 31 of a tire 3.

The vibration power generation element 11 is a vibration detection unit that outputs a detection signal corresponding to vibration in a direction contacting a circular orbit drawn by the tire side device 1 when the tire 3 rotates, that is, a tire tangential direction indicated by a direction of an arrow X in FIG. 2. In the present embodiment, the detection signal corresponding to the vibration in the tire tangential direction is output by the vibration power generation element 11, and additionally a vibration energy is converted into an electric energy, and a power supply of the tire side device 1 is generated based on the electric energy. For that reason, the vibration power generation element 11 is disposed to generate a power from the vibration in the tire tangential direction. For example, an electrostatic induction power generation element (for example, electret), a piezoelectric element, a friction element, a magnetostrictive element, or an electromagnetic induction element can be applied as the vibration power generation element 11 of the above type. If only the detection signal corresponding to the vibration in the tire tangential direction is output without considering an intended purpose for power generation, others, for example, an acceleration sensor can be used as the vibration power generation element 11.

For example, in the case where the electrostatic induction power generation element is used as the vibration power generation element 11, when an upper electrode to be positively charged by electrostatic induction vibrates in a horizontal direction with respect to a lower electrode having negative charges, static charges caused by the electrostatic induction are varied, and an electromotive force is produced to generate a power. The power supply of the tire side device 1 is generated based on the power generation of the vibration power generation element 11, and the detection signal corresponding to the magnitude of vibration in the tire tangential direction is generated.

In other words, when the vehicle having the road surface condition estimation device 100 travels, the tread 31 of the tire 3 vibrates due to various factors such as a rotational movement of the tire 3 and unevenness of a road surface. When the vibration is transmitted to the vibration power generation element 11, the power is generated by the vibration power generation element 11, and transmitted to the power supply circuit 12 to generate the power supply of the tire side device 1. Since an output voltage when the vibration power generation element 11 generates the power is changed according to the magnitude of vibration, the output voltage of the vibration power generation element 11 is transmitted to the processing circuit unit 13 as a detection signal indicative of the magnitude of vibration in the tire tangential direction. The output voltage of the vibration power generation element 11 is an AC voltage since the upper electrode reciprocates due to the vibration.

The power supply circuit 12 stores electricity based on the output voltage of the vibration power generation element 11 to generate the power supply, and supplies the power to the processing circuit unit 13 and the transmitter 14. The power supply circuit 12 includes a rectifier circuit 15 and an electric storage circuit 16.

The rectifier circuit 15 is a known circuit that converts the AC voltage output from the vibration power generation element 11 into a DC voltage. The AC voltage output by the vibration power generation element 11 is converted into a DC voltage by the rectifier circuit 15, and output to the electric storage circuit 16. The rectifier circuit 15 may be a full-wave rectifier circuit or a half-wave rectifier circuit.

The electric storage circuit 16 stores the DC voltage applied from the rectifier circuit 15, and may be implemented as a capacitor or the like. The output voltage of the vibration power generation element 11 is stored in the electric storage circuit 16 through the rectifier circuit 15, and with the stored voltage as a power supply, the power is supplied to the processing circuit unit 13 or the transmitter 14 provided in the tire side device 1. With the provision of the electric storage circuit 16 in the power supply circuit 12, when the vibration power generation element 11 excessively generate the power, the electric storage circuit 16 stores an excessive power, and when the amount of power generation is insufficient, the power supply circuit 12 compensates the insufficient power.

The processing circuit unit 13 corresponds to a signal processing unit, uses the output voltage of the vibration power generation element 11 as a detection signal indicative of vibration data in the tire tangential direction, processes the detection signal to obtain data indicative of the road surface condition, and transmits the data to the transmitter 14. More specifically, the processing circuit unit 13 identifies the ground contact section based on a temporal change in the output voltage of the vibration power generation element 11. The term "ground contact section" as used in the present specification means a section where a portion of the tread 31 of the tire 3 corresponding to the placement location of the vibration power generation element 11 contacts a road surface. The ground contact section is identified by comparing the pulse level of the output voltage of the vibration power generation element 11 with a threshold, but the pulse level of the output voltage varies according to the traveling speed. For that reason, the threshold is set according to the traveling speed by the section identification unit 17 which will be described later, thereby being capable of accurately identifying the ground contact section according to the traveling speed.

Since a high frequency component included in the detection signal in the ground contact section of the vibration power generation element 11 represents the road surface condition, the processing circuit unit 13 extracts the high frequency component, generates data indicative of the road surface condition based on the extracted high frequency component, and transmits the generated data to the transmitter 14.

Specifically, the processing circuit unit 13 includes a well-known microcomputer having various circuits, a CPU, a ROM, a RAM, and an I/O, and performs the above processing based on the output voltage of the vibration power generation element 11. The processing circuit unit 13 includes, as portions for performing those processing, a section identification unit 17 and a level calculation unit 18.

The section identification unit 17 performs functions of identifying the ground contact section and notifying the level calculation unit 18 that the vibration power generation element 11 is in the ground contact section. The section identification unit 17 includes a section extraction unit 17a, a peak value detection unit 17b, a threshold computation unit 17c, and a threshold setting unit 17d.

The section extraction unit 17a detects a peak value of the detection signal represented by the output voltage of the vibration power generation element 11, extracts a fact that the vibration power generation element 11 is in the ground contact section and transmits the fact that the vibration power generation element 11 is in the ground contact section to the level calculation unit 18. The section extraction unit 17a causes the transmitter 14 to generate a transmission trigger for transmitting a calculation result of the level calculation unit 18 to the vehicle side device 2 as road surface condition data indicative of the road surface condition. Hereinafter, a function of the section extraction unit 17a will be described in detail.

Figure 3:
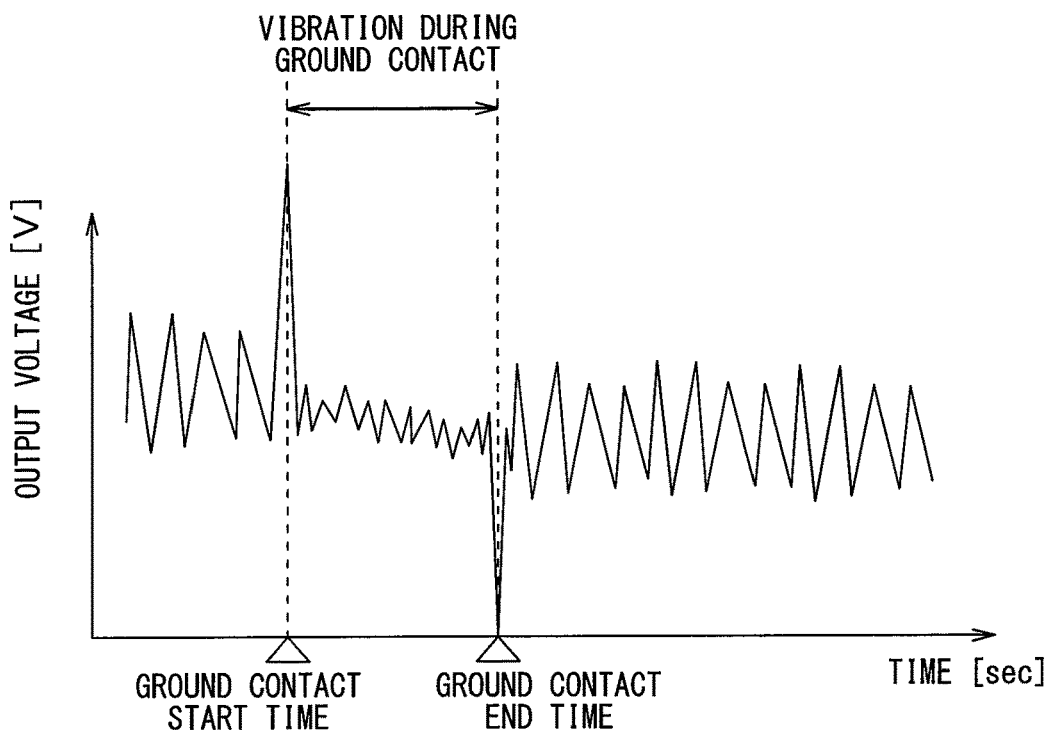
FIG. 3 is an output voltage waveform diagram of a vibration power generation element during tire rotation.

An output voltage waveform of the vibration power generation element 11 during tire rotation is, for example, illustrated in FIG. 3. As illustrated in the figure, at a ground contact start time when a portion of the tread 31 corresponding to the placement location of the vibration power generation element 11 starts to contact the road in association with the rotation of the tire 3, the output voltage of the vibration power generation element 11 reaches a maximum value. In the section extraction unit 17a, a timing of a first peak value when the output voltage of the vibration power generation element 11 becomes the maximum value is detected as the ground contact start time. Specifically, when the output voltage of the vibration power generation element 11 becomes larger than a first threshold set by the threshold setting unit 17d as will be described later, a next maximum value is detected and set as the ground contact start time. In this manner, the maximum value of the output voltage is detected on condition that the output voltage of the vibration power generation element 11 becomes larger than the first threshold, thereby being capable of accurately detecting the ground contact start time.

Further, as illustrated in FIG. 3, at a ground contact end time when changing from a state in which the portion of the tread 31 corresponding to the placement position of the vibration power generation element 11 contacts the ground to a state in which the portion no longer contacts the ground with the rotation of the tire 3, the output voltage of the vibration power generation element 11 reaches a minimum value. In the section extraction unit 17a, a timing of a second peak value when the output voltage of the vibration power generation element 11 becomes a minimum value is detected as a ground contact end time. Specifically, when the output voltage of the vibration power generation element 11 becomes smaller than a second threshold identified by the section identification unit 17 as will be described later, a next minimum value is detected and set as the ground contact end time. In this manner, the minimum value of the output voltage is detected on condition that the output voltage of the vibration power generation element 11 becomes smaller than the second threshold, thereby being capable of accurately detecting the ground contact start time.

The reason why the vibration power generation element 11 reaches the peak values at the timings described above will be described below. In other words, when the portion of the tread 31 corresponding to the placement location of the vibration power generation element 11 contacts the road in association with the rotation of the tire 3, a portion of the tire 3 which has been shaped into substantially a cylindrical surface till that time in the vicinity of the vibration power generation element 11 is pressed, and deformed into a planar shape. Upon receiving an impact at the time of the deformation, the output voltage of the vibration power generation element 11 reaches the first peak value. When the portion of the tread 31 corresponding to the placement location of the vibration power generation element 11 is separated from the ground contact surface in association with the rotation of the tire 3, the tire 3 is released from being pressed and returns to the substantially cylindrical shape from the planar shape in the vicinity of the vibration power generation element 11. Upon receiving an impact when returning the shape of the tire 3 to an original, the output voltage of the vibration power generation element 11 reaches the second peak value. As described above, the output voltage of the vibration power generation element 11 reaches the first and second peak values at the ground contact start time and the ground contact end time, respectively. Because a direction of the impact when the tire 3 is pressed is opposite to a direction of the impact when the tire 3 is released from being pressed, signs of the output voltage are also opposite to each other.

The section extraction unit 17a transmits the timings of the first and second peak values to the level calculation unit 18, and issues an instruction for rectifying and integrating the high frequency components included in the output voltage of the vibration power generation element 11 in a period from the timing of the first peak value to the timing of the second peak value. As described above, the section extraction unit 17a extracts the ground contact section of the vibration power generation element 11, and transmits a fact that the vibration power generation element 11 is in the ground contact section to the level calculation unit 18.

Because the timing when the output voltage of the vibration power generation element 11 becomes the second peak value is set to the ground contact end time of the vibration power generation element 11, the section extraction unit 17a transmits a transmission trigger to the transmitter 14. As a result, the transmitter 14 transmits the calculation result transmitted from the level calculation unit 18 as the road surface condition data. Because the data transmission by the transmitter 14 is not always performed, but is performed exclusively at the ground contact end time of the vibration power generation element 11, the power consumption can be reduced.

The peak value detection unit 17b detects the peak value of the output voltage of the vibration power generation element 11 and stores the detected peak value as the peak value of the output voltage of the vibration power generation element 11 during a previous tire rotation, that is, a previous one rotation.

Figure 4A:
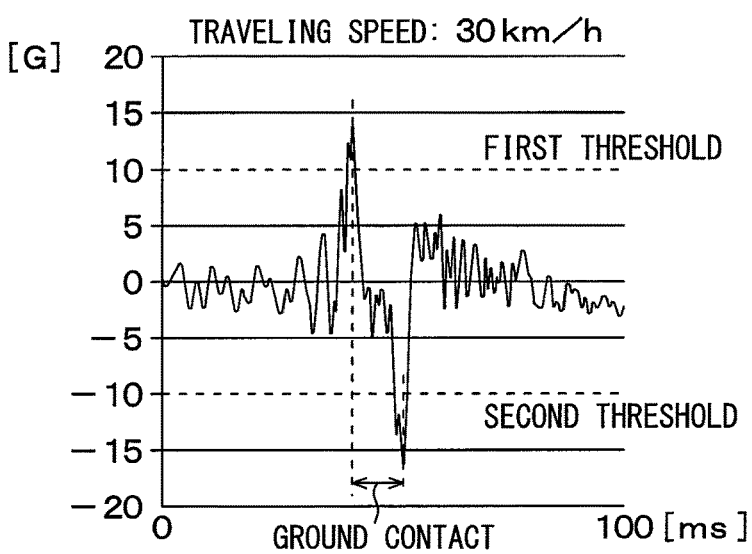
FIG. 4(a) is a graph showing a relationship between a waveform of a vibration acceleration to be applied to the vibration power generation element and thresholds when a traveling speed is 30 km/h.
Figure 4B:
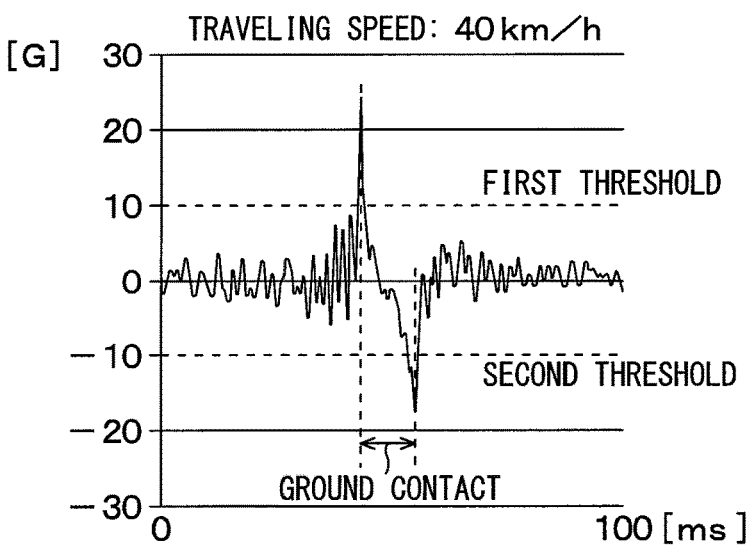
FIG. 4(b) is a graph showing a relationship between the waveform of the vibration acceleration to be applied to the vibration power generation element and the thresholds when the traveling speed is 40 km/h.
Figure 4C:
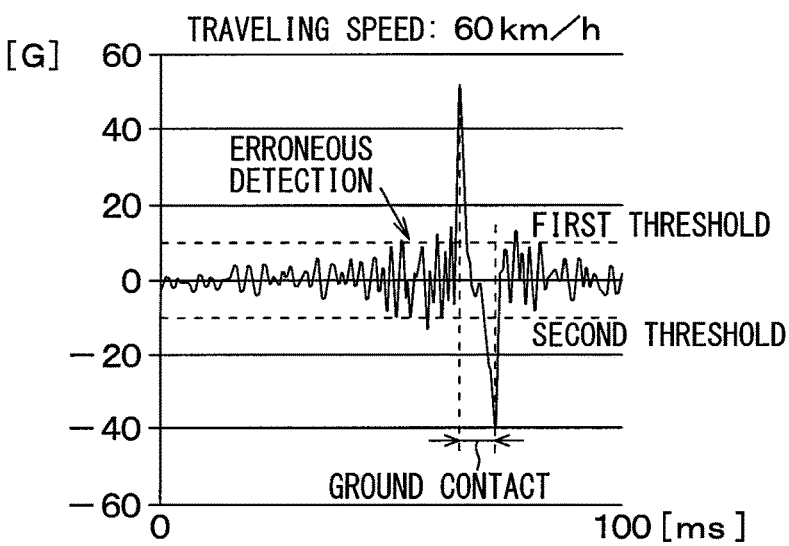
FIG. 4(c) is a diagram showing a relationship between the waveform of the vibration acceleration to be applied to the vibration power generation element and the thresholds when the traveling speed is 60 km/h.

The threshold computation unit 17c calculates the first threshold and the second threshold based on the peak value of the output voltage of the vibration power generation element 11 at the previous tire rotation time stored by the peak value detection unit 17b. In other words, the pulse level of the output voltage of the vibration power generation element 11 is varied according to the traveling speed. For example, as shown in FIGS. 4(a) to 4(c), the pulse level of the output voltage of the vibration power generation element 11 decreases more as the traveling speed of the vehicle decreases more, and the pulse level of the output voltage of the vibration power generation element 11 increases more as the traveling speed of the vehicle increases more. Incidentally, in FIGS. 4(a) to 4(c), an axis of ordinate represents an acceleration applied to the vibration power generation element 11, and the output voltage of the vibration power generation element 11 also has the same waveform.

Therefore, in the case where the first threshold and the second threshold are set to constant values, even if the output voltage of the vibration power generation element 11 takes the maximum value or the minimum value when the traveling speed of the vehicle is low, the output voltage may not exceed a range from the first threshold to the second threshold. In addition, in the case where the first threshold and the second threshold are set to constant values, even if the output voltage of the vibration power generation element 11 do not take the maximum value or the minimum value when the traveling speed of the vehicle is high, the output voltage may exceed the range from the first threshold to the second threshold. In that case, as shown in FIG. 4(c), the maximum value and the minimum value may be erroneously detected.

For that reason, in the present embodiment, the first threshold and the second threshold are changed according to the peak value of the output voltage of the vibration power generation element 11 during the previous tire rotation into a value following the traveling speed of the vehicle.

More specifically, the first threshold is calculated based on the first peak value during the previous tire rotation and the second threshold is calculated based on the second peak value during the previous tire rotation.

As for the first threshold, an initial value is set, and the initial value is corrected to set a new first threshold. The initial value is set to a threshold at a lowest traveling speed to be sensed. For example, the first threshold is increased more as the first peak value becomes larger according to the first peak value at the previous tire rotation, and is decreased more as the first peak value becomes smaller. For example, the first threshold is increased or decreased by a difference between the first peak values during the previous and current tire rotations, or by a difference obtained by multiplying the difference by a predetermined coefficient.

As for the second threshold, an initial value is set, and the initial value is corrected to set a new second threshold. The initial value is set to a threshold at a lowest traveling speed to be sensed. The second threshold is set to a value smaller than the first threshold. For example, the second threshold is set to be smaller as the second peak value becomes smaller, and is set to be larger as the second peak value becomes larger, according to the second peak value during the previous tire rotation. For example, the second threshold is decreased or increased by the difference between the second peak values during the previous and current tire rotations, or by the difference obtained by multiplying the difference by a predetermined coefficient.

In this manner, the first threshold and the second threshold are variably set based on the first peak value and the second peak value during the previous tire rotation. As a result, even if the pulse level of the output voltage of the vibration power generation element 11 changes according to the traveling speed of the vehicle, the first threshold and the second threshold can be set according to the change. Therefore, the ground contact section is determined according to the first threshold and the second threshold described above, thereby being capable of performing the determination with high accuracy.

After the first threshold and the second threshold have been changed from the initial values, when the maximum values and the minimum values of the output signals of the vibration power generation element 11 by a predetermined tire rotation number do not exceed the range between the first threshold and the second threshold, the first threshold and the second threshold are again returned to the initial values. In this way, the threshold setting unit is provided with an initial value setting unit that returns the changed first threshold and the changed second threshold to the respective initial values, thereby being capable of returning the first and second thresholds to the initial values at an extremely low speed at which the vehicle is traveling at an extremely low speed, or at the time of stop.

Upon receiving the fact that vibration power generation element 11 is in the ground contact section from the section extraction unit 17a, the level calculation unit 18 calculates the level of the high frequency component caused by the vibration of the tire 3 included in the output voltage of the vibration power generation element 11 during that period. The level calculation unit 18 transmits the calculation result to the transmitter 14 as road surface condition data indicative of the road surface condition. The level calculation unit 18 calculates the level of the high frequency component as an index indicative of the road surface condition, and its reason will be described with reference to FIGS. 5 and 6.

Figure 5A:
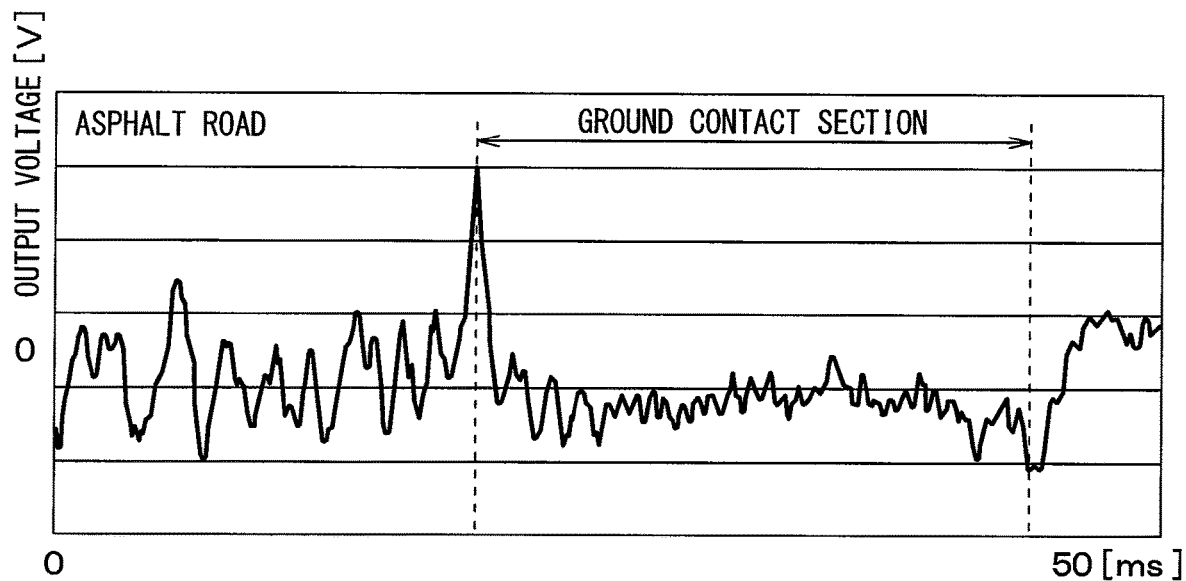
FIG. 5(a) is a graph showing a change in output voltage of the vibration power generation element when traveling on a high μ road surface whose road surface friction coefficient (hereinafter referred to as μ) is relatively large such as an asphalt road.
Figure 5B:
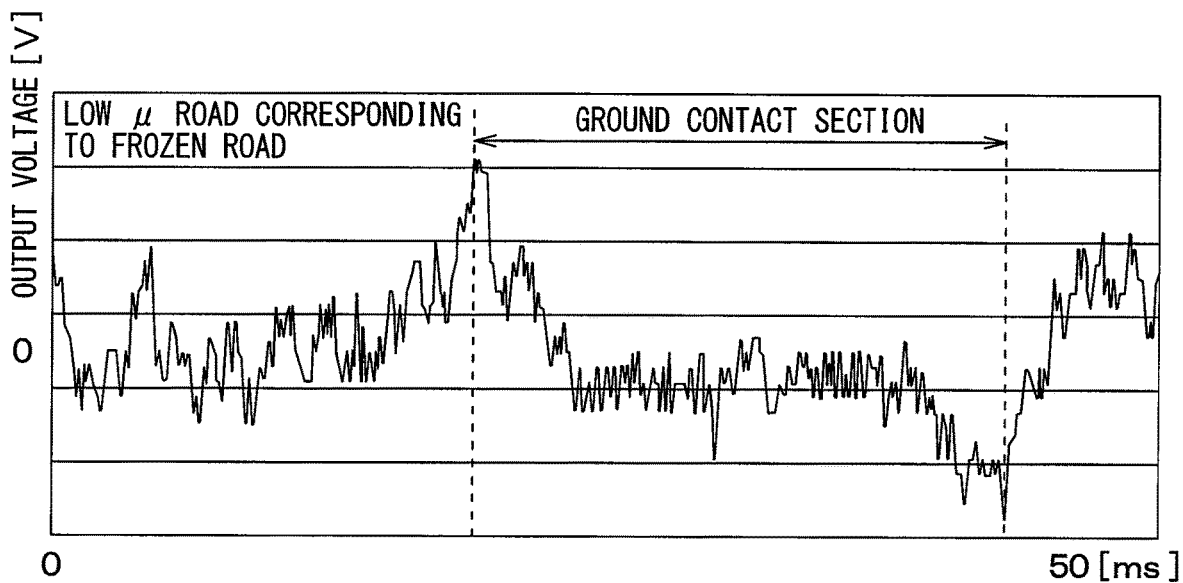
FIG. 5(b) is a graph showing a change in the output voltage of the vibration power generation element when traveling on a low μ road surface whose road surface μ is relatively small such as a frozen road.

FIG. 5(a) shows a change in output voltage of the vibration power generation element 11 when traveling on a high μ road surface whose road surface μ is relatively large such as an asphalt road. FIG. 5(b) shows a change in the output voltage of the vibration power generation element 11 when traveling on a low μ road surface whose road surface μ is relatively small such as a frozen road.

Figure 6:
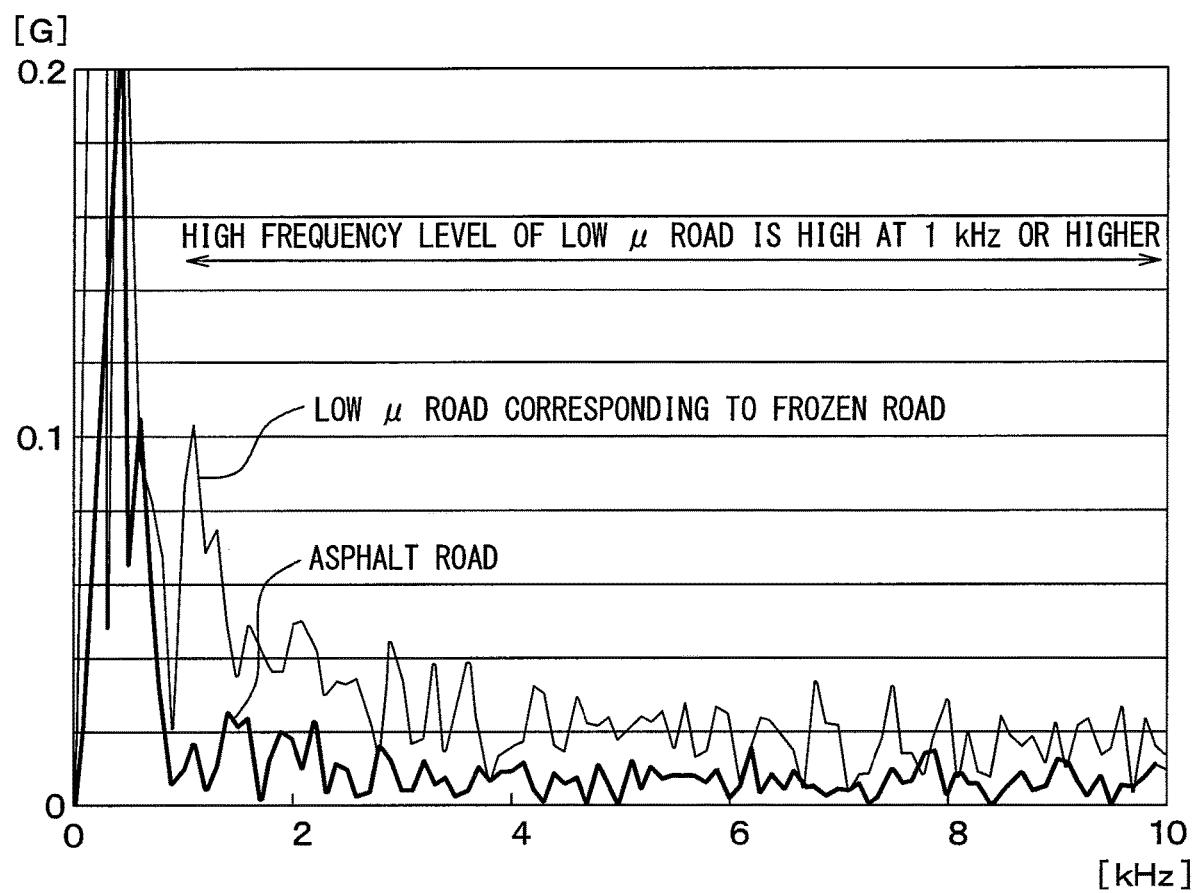
FIG. 6 is a graph showing results of performing a frequency analysis of the output voltage in a ground contact section in each of the case of traveling on the high μ road surface and the case of traveling on the low μ road surface.

As is understood from the above-described figures, the first and second peak values appear at a beginning and a last of the ground contact section, that is, at the ground contact start time and the ground contact end time of the vibration power generation element 11 regardless of the road surface μ. However, fine high frequency vibration caused by slip of the tire 3 is superimposed on the output voltage when the vehicle travels on the low μ road surface due to an influence of the road surface μ. For that reason, in each of the case of traveling on the high μ road surface and the case of traveling on the low μ road surface, when the frequency analysis of the output voltage in the ground contact section is performed, results illustrated in FIG. 6 are obtained. In other words, in a low frequency band, a high level is obtained when traveling on each of the high μ road and the low μ road. However, in a high frequency band of 1 kHz or higher, the level when traveling on the low μ road is higher than that when traveling on the high μ road. For that reason, the level of the high frequency component of the output voltage of the vibration power generation element 11 serves as an index indicative of the road surface condition.

Therefore, the level of the high frequency component of the output voltage of the vibration power generation element 11 which is in the ground contact section is calculated by the level calculation unit 18, and the calculated level can be set as the road surface condition data. For example, the level of the high frequency component can be calculated by extracting the high frequency component from the output voltage of the vibration power generation element, and integrating the high frequency component extracted in the ground contact section.

Figure 7:
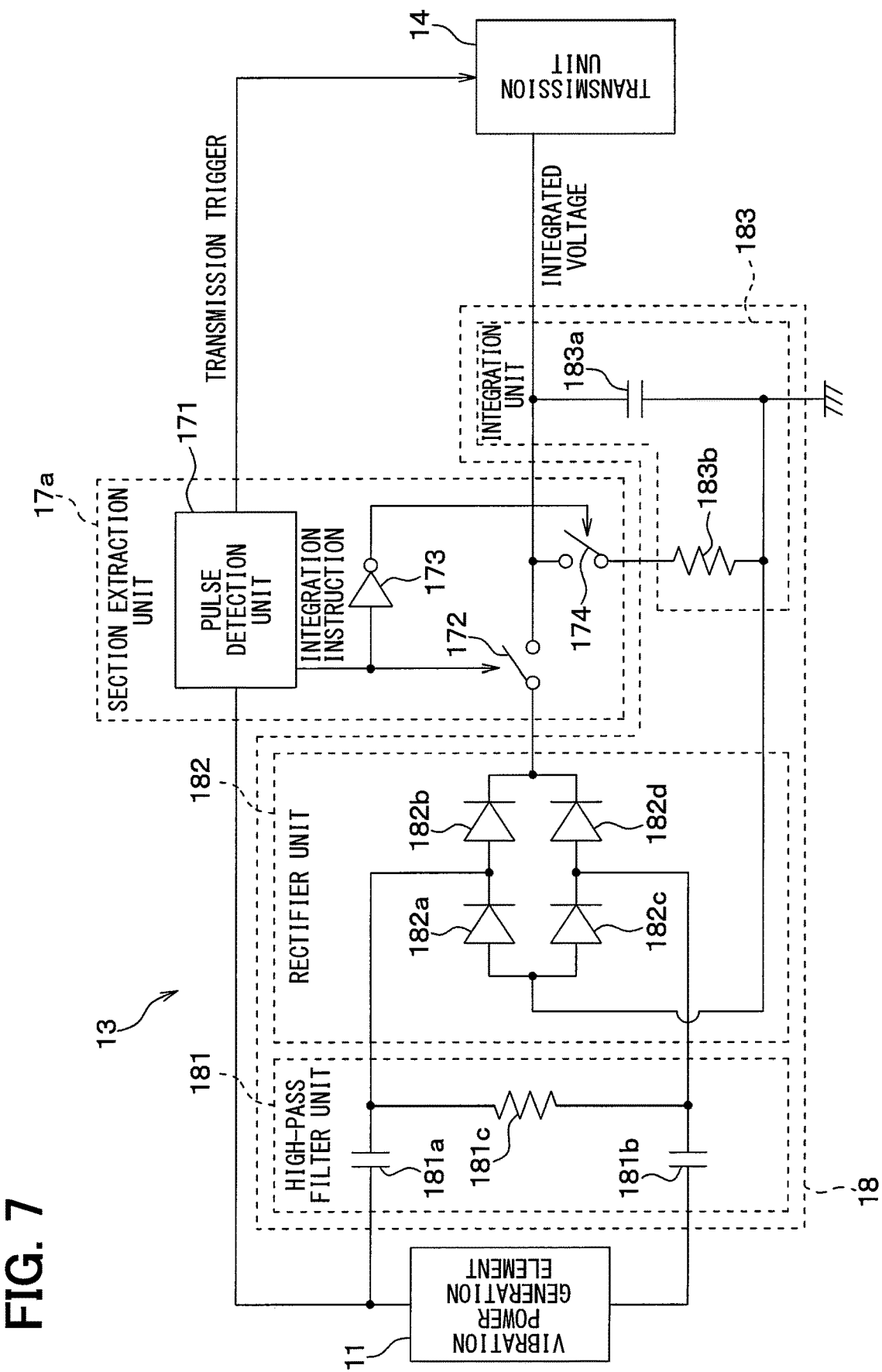
FIG. 7 is a diagram illustrating a specific circuit configuration of a processing circuit unit when a level of a high frequency component is calculated according to an integration of high frequency components extracted during the ground contact section.

FIG. 7 is a diagram illustrating a specific circuit configuration of the processing circuit unit 13 which is applied when calculating the level of the high frequency component according to the integration of the high frequency components extracted during the ground contact section of the vibration power generation element 11.

Referring to FIG. 7, the section extraction unit 17a receives the detection signal (output voltage) of the vibration power generation element 11, and outputs an integration instruction signal to the level calculation unit 18 while outputting the transmission trigger to the transmitter 14 based on the analysis result of the detection signal.

Specifically, the section extraction unit 17a includes a ground contact pulse detection unit 171, and the ground contact pulse detection unit 171 detects the peaks of the detection signal at the time of the ground contact start time and the ground contact end time of the vibration power generation element 11. The ground contact pulse detection unit 171 outputs the integration instruction signal at timing when the detection signal of the vibration power generation element 11 reaches the first peak value, and cancels the integration instruction signal at timing when the detection signal reaches the second peak value. In the present embodiment, when the high level is output as the integration instruction signal from the ground contact pulse detection unit 171, a switch 172 turns on, and the high level is inverted by an inverter 173. Upon receiving the inverted low level, a switch 174 turns off, and the integration of the high frequency component starts. When the integration instruction signal is cancelled, and the output of the ground contact pulse detection unit 171 becomes low level, the switch 172 turns off, and the low level is inverted by the inverter 173. Upon receiving the inverted high level, the switch 174 turns on, and the integration of the high frequency component is terminated.

The level calculation unit 18 includes a high-pass filter unit 181, a rectifier unit 182, and an integration unit 183.

The high-pass filter unit 181 is a high frequency component extraction unit that extracts the high frequency component of the detection signal of the vibration power generation element 11. The high-pass filter unit 181 includes a CR filter circuit having capacitors 181a, 181b, and a resistor 181c, and passes only the high frequency component of the detection signal of the vibration power generation element 11 with the adjustment of a capacitance value of the capacitors 181a and 181b, and a resistance value of the resistor 181c.

The rectifier unit 182 includes a full-wave rectifier circuit having diodes 182a to 182d arranged in a bridge shape, and full-wave rectifies the high frequency component of the detection signal extracted by the high-pass filter unit 181. As a result, only a positive voltage that has been subjected to the full-wave rectification is applied to the integration unit 183.

The integration unit 183 integrates the high frequency component of the detection signal of the vibration power generation element 11, and in the present embodiment, the integration unit 183 includes a capacitor 183a and a resistor 183b.

The capacitor 183a is charged based on the high frequency component that has been subjected to the full-wave rectification. A charging voltage of the capacitor 183a corresponds to a value obtained by integrating the high frequency components, and an integrated voltage value of the capacitor 183a is input to the transmitter 14 as data indicative of the road surface condition. In other words, as illustrated in FIG. 6, since the level of the high frequency component of the detection signal of the vibration power generation element 11 is different between a case where the traveling road surface is the low μ road surface and a case where the traveling road surface is the high μ road surface, the integrated voltage value of the capacitor 183a is changed according to the road surface condition.

Figure 8:
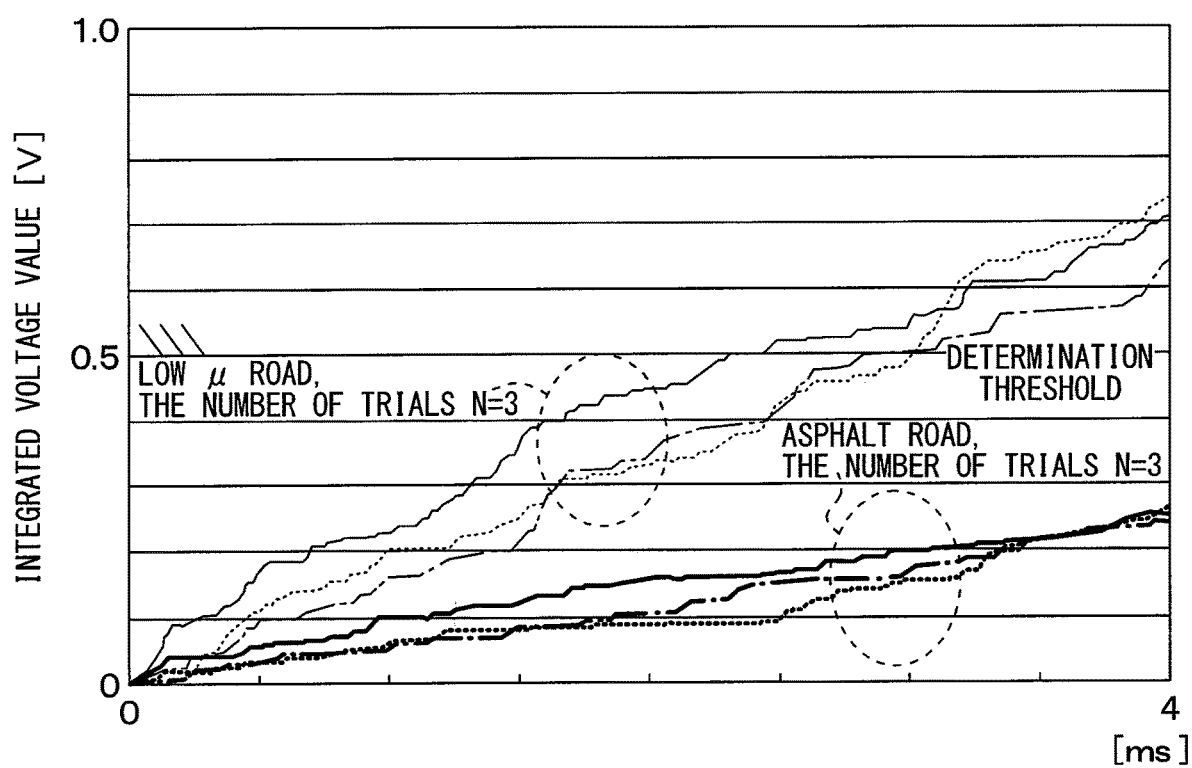
FIG. 8 is a graph showing a charging appearance in a capacitor in each of the case where the traveling road surface is the low μ road surface, and the case where the traveling road surface is the high μ road surface.

FIG. 8 shows a charging appearance in the capacitor 183a in each of the case where the traveling road surface is the low μ road surface, and the case where the traveling road surface is the high μ road surface, that is, the asphalt road. In each case, the charging operation is attempted three times, that is, the number of attempts N=3. As illustrated in the figure, when the traveling road surface is the low μ road surface, because the level of the high frequency component of the detection signal of the vibration power generation element 11 is larger than that in the high μ road surface, the integrated voltage value of the capacitor 183a becomes larger. As described above, because the magnitude of the integrated voltage value of the capacitor 183a is varied according to the road surface condition, the integrated voltage value of the capacitor 183a becomes data indicative of the road surface condition.

When the ground contact pulse detection unit 171 cancels the integration instruction signal to turn on the switch 174, the resistor 183b is connected to the capacitor 183a to charge the capacitor 183a. As a result, when the high frequency component is then integrated, a voltage across the capacitor 183a can be reset to 0.

The processing circuit unit 13 can be formed by the above circuit, and the high frequency component of the output voltage of the vibration power generation element 11 is integrated by the integration unit 183, thereby being capable of calculating the level of the high frequency component in a state where the vibration power generation element 11 is in the ground contact section.

The transmitter 14 transmits the road surface condition data transmitted from the processing circuit unit 13 to the vehicle side device 2. A communication between the transmitter 14 and a receiver 21 provided in the vehicle side device 2 can be implemented by a known short-range wireless communication technology such as Bluetooth (registered trademark). Timing at which the road surface condition data is transmitted is arbitrary, but as described above, in the present embodiment, the transmission trigger is transmitted from the section extraction unit 17a at the ground contact end time of the vibration power generation element 11 to transmit the road surface condition data from the transmitter 14. Because the data transmission by the transmitter 14 is not always performed, but is performed exclusively at the ground contact end time of the vibration power generation element 11, the power consumption can be reduced.

The road surface condition data can be transmitted together with unique identification information (hereinafter referred to as "ID information") on a wheel provided for each tire 3 equipped in the vehicle in advance. Since a position of each wheel can be identified by a known wheel position detection device for detecting any position of the vehicle to which the wheel is attached, the road surface condition data is transmitted to the vehicle side device 2 together with the ID information, thereby being capable of discriminating which wheel the data is related to. Normally, it is assumed that the road surface μ of the traveling road surface is uniform. However, there is a μ split road different in the road surface μ between right and left wheels of the vehicle, and in such a μ sprit road, the road surface condition data is preferably transmitted for each wheel. It is needless to say that the road surface condition is not estimated for each wheel, but multiple road surface condition data may be used as the estimation of the road surface condition such that a mean value of the integrated voltage value indicated by the road surface condition data transmitted from each wheel is used for the estimation of the road surface condition.

On the other hand, the vehicle side device 2 includes the receiver 21 and a road surface condition estimation unit 22. The road surface condition estimation unit 22 receives the road surface condition data transmitted from the tire side device 1, and performs various processing based on the received data to detect the road surface condition during traveling.

The receiver 21 receives the road surface condition data transmitted by the tire side device 1. The road surface condition data received by the receiver 21 is sequentially output to the road surface condition estimation unit 22 every time receiving the data.

The road surface condition estimation unit 22 includes a known microcomputer having a CPU, a ROM, a RAM, an I/O, and so on, and performs processing for detecting the road surface condition according to a program stored in the ROM or the like. Specifically, the road surface condition estimation unit 22 estimates the road surface μ based on the magnitude of the integrated voltage value indicated by the road surface condition data. For example, the road surface condition estimation unit 22 determines that the traveling road surface is the low μ road surface if the integrated voltage value is larger than a determination threshold, and the traveling road surface is the high μ road surface if the integrated voltage value is smaller than the determination threshold. As shown in FIG. 8, the determination threshold is set to an intermediate value between the integrated voltage value assumed when the traveling road surface is the low μ road surface and the integrated voltage value assumed when the traveling road surface is the high μ road surface. For that reason, the road surface condition of the traveling road surface can be estimated according to a comparison with the determination threshold.

When the road surface condition is estimated by the vehicle side device 2 as described above, the estimation result is communicated on, for example, a CAN (abbreviation of controller area network) that is a vehicle network. The estimation result of the road surface condition is input to, for example, an electronic control device for brake control (so-called brake ECU), and used for setting an index when performing an antilock brake control, for example, a control start threshold in the antilock brake control.

As described above, the road surface condition estimation device 100 according to the present embodiment extracts the detection signal of the vibration power generation element 11 during the ground contact section to detect the road surface condition. The threshold used for determination that the vibration power generation element 11 is in the ground contact section in that situation is variable according to the traveling speed of the vehicle. As a result, even if the pulse level of the output voltage of the vibration power generation element 11 changes according to the traveling speed of the vehicle, the threshold corresponding to the change can be set. The ground contact section is determined with the use of the above thresholds, thereby being capable of performing the determination with high accuracy. Therefore, the road surface condition can be detected with high accuracy based on the ground contact section determined with high accuracy.

In addition, in the tire side device 1, the level of the high frequency component of the detection signal from the vibration power generation element 11 that is in the ground contact section is calculated, and the calculated level is transmitted as the road surface condition data. The road surface condition data is received by the vehicle side device 2 to estimate the road surface condition of the traveling road surface. As a result, the road surface condition can be estimated even without performing the frequency analysis, and the power consumption can be reduced while the number of frequency analysis components can be reduced. Therefore, the costs can be reduced.

In addition, in the processing circuit unit 13, after the detection signal of the vibration power generation element 11 passes through the high-pass filter unit 181 to extract the high frequency component, the high frequency component is rectified, and the capacitor 183a is then charged till the ground contact end time of the vibration power generation element 11 to obtain the integrated voltage value. In this way, because a portion of the processing circuit unit 13 except for the ground contact pulse detection unit 171 can be mainly formed by an analog circuit, signal processing can be performed with a circuit of the low costs and the space saving. In addition, because the tire side device 1 may transmit the integrated voltage value caused by the capacitor 183a as the road surface condition data, the amount of transmission data from the tire side device 1 to the vehicle side device 2 can be remarkably reduced, and the power consumption can be more reduced. Therefore, the tire side device 1 can be downsized such that the vibration power generation element 11 provided in the tire side device 1 can be downsized, and mounting of the tire side device 1 into the tire 3 can be facilitated.

In the above embodiment, the case in which the first threshold and the second threshold are independently set for changing the first threshold based on the first peak value and changing the second threshold based on the second peak value has been described. Alternatively, the first threshold and the second threshold can be set in association with each other so that the first threshold and the second threshold are more precisely set.

Specifically, only when the maximum value during the current tire rotation is larger than the first peak value and the minimum value during the current tire rotation is smaller than the second peak value, the first threshold is changed to a large value, and the second threshold is changed to a small value as compared with the previous one rotation. Likewise, only when the maximum value during the current tire rotation is smaller than the first peak value and the minimum value during the current tire rotation is larger than the second peak value, the first threshold is changed to a small value, and the second threshold is changed to a large value as compared with the previous one rotation.

In this way, if the first threshold and the second threshold are changed only when both of the maximum value and the minimum value show similar changes, when the maximum value or the minimum value changes in a noise manner, the first threshold and the second threshold can be prevented from being erroneously changed.

Second Embodiment

A second embodiment will be described. The present embodiment is different from the first embodiment in a method of setting the thresholds used for detection of the ground contact section, and others are the same as those of the first embodiment. Therefore, only parts different from those in the first embodiment will be described.

In the first embodiment, the first threshold and the second threshold are set based on the first peak value and the second peak value during the previous tire rotation. On the other hand, in the present embodiment, a first threshold and a second threshold are set based on a time interval (hereinafter referred to as a "ground contact pulse interval") between a first peak value and a second peak value during a previous tire rotation.

In other words, the ground contact pulse interval changes according to a traveling speed of a vehicle, and is longer as the traveling speed is lower and shorter as the traveling speed is higher. For that reason, the ground contact pulse interval changes according to the traveling speed of the vehicle. Therefore, thresholds corresponding to the traveling speeds are set based on the ground contact pulse interval so as to accurately extract the ground contact section corresponding to the traveling speed.

Figure 9:
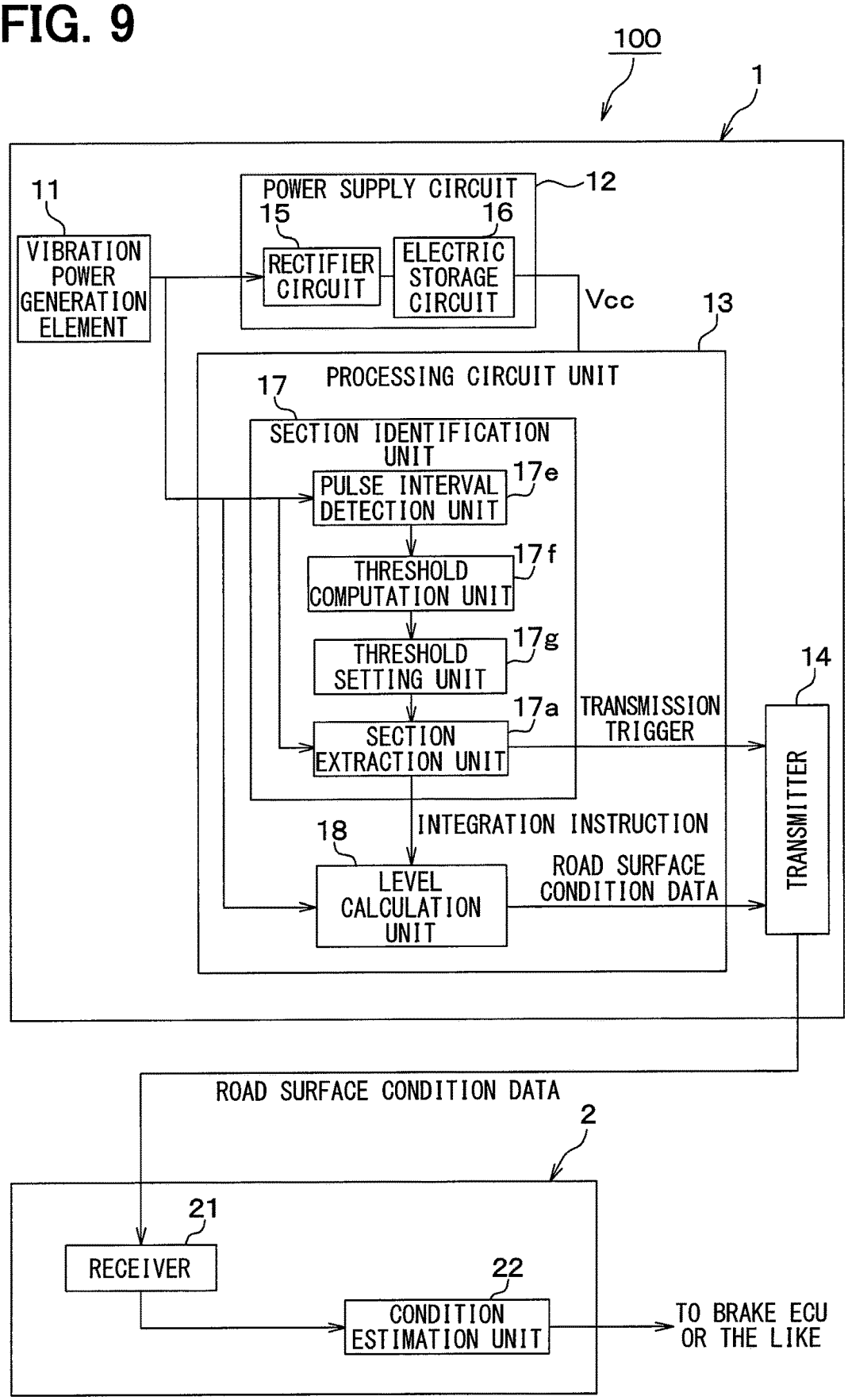
FIG. 9 is a diagram illustrating an overall block configuration of a road surface condition estimation device according to a second embodiment.

Specifically, in the present embodiment, as shown in FIG. 9, a section identification unit 17 is configured to include a pulse interval detection unit 17e, a threshold computation unit 17f, and a threshold setting unit 17g.

The pulse interval detection unit 17e detects a first peak value that is a maximum value of an output voltage of a vibration power generation element 11 and a second peak value that is a minimum value and stores a time interval between those peak values as the ground contact pulse interval during a previous tire rotation.

Figure 10A:
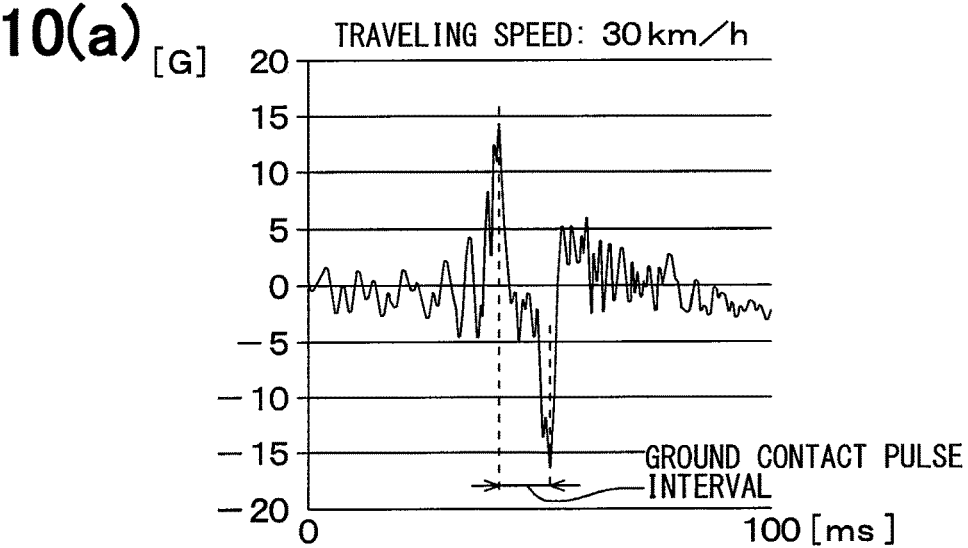
FIG. 10(a) is a graph showing a relationship between a waveform of a vibration acceleration to be applied to the vibration power generation element and a ground contact pulse interval when a traveling speed is 30 km/h.
Figure 10B:
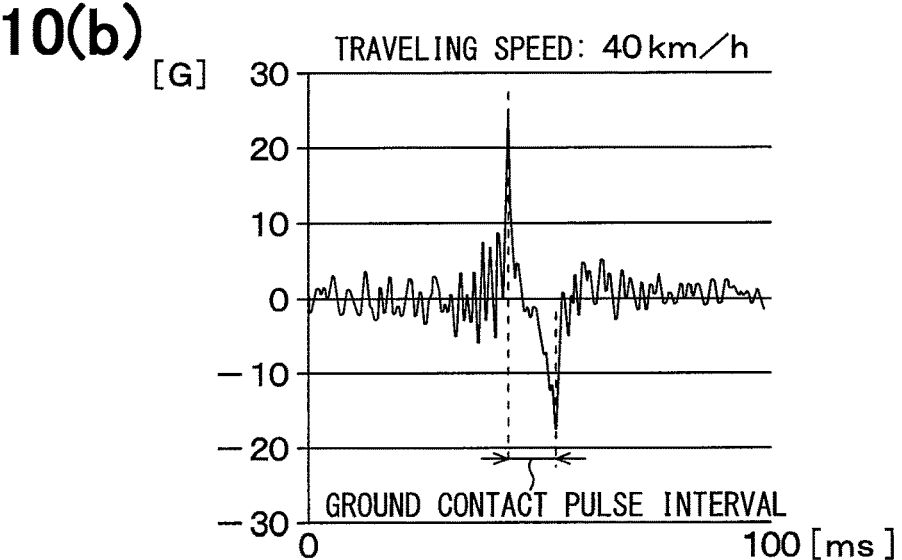
FIG. 10(b) is a graph showing a relationship between the waveform of the vibration acceleration to be applied to the vibration power generation element and the ground contact pulse interval when the traveling speed is 40 km/h.
Figure 10C:
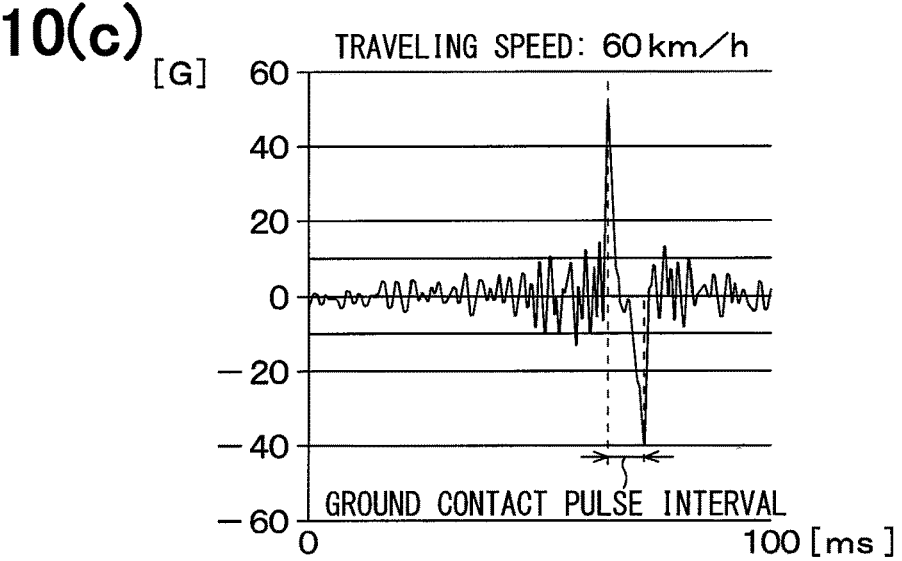
FIG. 10(c) is a graph showing a relationship between the waveform of the vibration acceleration to be applied to the vibration power generation element and the ground contact pulse interval when the traveling speed is 60 km/h.

The threshold computation unit 17f calculates a first threshold and a second threshold based on the ground contact pulse interval during the previous tire rotation stored by the pulse interval detection unit 17e. The ground contact pulse interval varies according to the traveling speed. For example, as shown in FIGS. 10(a) to 10(c), the ground contact pulse interval is shorter as the traveling speed of the vehicle is lower, and the ground contact pulse interval is longer as the traveling speed of the vehicle is higher.

For that reason, in the present embodiment, the first threshold and the second threshold are changed according to the ground contact pulse interval during the previous tire rotation into values following the traveling speed of the vehicle. Specifically, the first threshold and the second threshold are variably set in the following manner.

As for the first threshold, an initial value is set, and the initial value is corrected to set a new first threshold. The initial value is set to a threshold at a lowest traveling speed to be sensed. For example, the first threshold is set to be smaller as the ground contact pulse interval during the previous tire rotation becomes longer, and is set to be larger as the ground contact pulse interval becomes shorter. For example, the first threshold is increased or decreased by a value obtained by multiplying a difference between the previous and current ground contact pulse intervals by a predetermined coefficient.

As for the second threshold, an initial value is set, and the initial value is corrected to set a new second threshold. The initial value is set to a threshold at a lowest traveling speed to be sensed. For example, the second threshold is set to be smaller than the first threshold, and for example, the second threshold is set to be larger as the ground contact pulse interval during the previous tire rotation becomes longer, and is set to be smaller as the ground contact pulse interval becomes shorter. For example, the second threshold is decreased or increased by a value obtained by multiplying a difference between the ground contact pulse intervals during the previous and current tire rotations by a predetermined coefficient.

In this manner, the first threshold and the second threshold are variably set based on the ground contact pulse interval during the previous tire rotation. As a result, even if the pulse level of the output voltage of the vibration power generation element 11 changes according to the traveling speed of the vehicle, the first threshold and the second threshold can be set according to the change. Therefore, the ground contact section is determined according to the first threshold and the second threshold described above, thereby being capable of performing the determination with high accuracy.

After the first threshold and the second threshold have been changed from the initial values, when the maximum values and the minimum values of the output signals of the vibration power generation element 11 by a predetermined tire rotation number do not exceed the range between the first threshold and the second threshold, the first threshold and the second threshold are again returned to the initial values. In this way, the threshold setting unit is provided with an initial value setting unit that returns the changed first threshold and the changed second threshold to the respective initial values, thereby being capable of returning the first and second thresholds to the initial values at an extremely low speed at which the vehicle is traveling at an extremely low speed, or at the time of stop.

As described above, the first threshold and the second threshold can be variably set based on the ground contact pulse interval during the previous tire rotation. Even with the above manner, the same advantages as those in the first embodiment can be obtained.

The setting of the first threshold and the second threshold based on the ground contact pulse period described in the present embodiment and the setting of the first threshold and the second threshold based on the first peak value and the second peak value described in the first embodiment can be combined together.

In other words, it is determined whether the maximum value during the current tire rotation is larger than the first peak value, the minimum value during the current tire rotation is smaller than the second peak value, and the ground contact pulse interval during the current tire rotation is shorter than the ground contact pulse interval of the previous one rotation, or not. Only when those conditions are satisfied, the first threshold is changed to a value larger than that in the previous one rotation, and the second threshold is changed to a value smaller than that in the previous one rotation. Likewise, it is determined whether the maximum value during the current tire rotation is smaller than the first peak value, the minimum value during the current tire rotation is larger than the second peak value, and the ground contact pulse interval during the current tire rotation is longer than the ground contact pulse interval of the previous one rotation, or not. Only when those conditions are satisfied, the first threshold is changed to a value smaller than that in the previous one rotation, and the second threshold is changed to a value larger than that in the previous one rotation.

This makes it possible to more accurately set the first threshold and the second threshold. Moreover, the ground contact section is precisely recognized, thereby being capable of detecting the road surface condition with higher accuracy.

Third Embodiment

A third embodiment will be described. The present embodiment is different from the first embodiment in a method of setting the first threshold and the second threshold, and others are the same as those of the first embodiment. Therefore, only parts different from those in the first embodiment will be described.

In the present embodiment, in order to further reduce erroneous setting of a first threshold and a second threshold, a mask processing of a first peak value and a second peak value using a ground contact pulse interval described in the second embodiment is performed.

In other words, since the ground contact pulse interval corresponds to a traveling speed of a vehicle, the traveling speed of the vehicle can be estimated based on the ground contact pulse interval, and further a time required to reach a next ground contact section can be estimated. Therefore, a section extraction unit 17a is provided with a mask function so that the first peak value and the second peak value are not set before an estimated time at which to reach the next ground contact section.

For example, the section extraction unit 17a calculates an estimated time required to reach the next ground contact section from a current ground contact end time based on a previous ground contact pulse interval. Even if an output voltage of a vibration power generation element 11 becomes larger than the first threshold or becomes smaller than the second threshold during a predetermined period before the estimated time, the section extraction unit 17a prevents the first peak value and the second peak value from being set. As described above, when it is assumed that the vibration power generation element 11 is not in the ground contact section, even if the output voltage of the vibration power generation element 11 becomes larger than the first threshold or smaller than the second threshold, the first peak value and the second peak value are prevented from being set. This makes it possible to perform erroneous determination as the ground contact section, or to prevent the first threshold value and the second threshold value from being erroneously changed.

This makes it possible to more accurately set the first threshold and the second threshold. Moreover, the ground contact section is precisely recognized, thereby being capable of detecting the road surface condition with higher accuracy.

Fourth Embodiment

A fourth embodiment will be described. Similarly, the present embodiment is different from the first embodiment in a method of setting the first threshold and the second threshold, and others are the same as those of the first embodiment. Therefore, only parts different from those in the first embodiment will be described.

In the first embodiment, the first threshold and the second threshold are set based on the first peak value and the second peak value during the previous tire rotation. In contrast, in the present embodiment, a first threshold and a second threshold are set based on a centrifugal force (hereinafter referred to as "tire centrifugal force") acting by a tire rotation.

In other words, the tire centrifugal force changes according to a traveling speed of a vehicle, and is smaller as the traveling speed is lower and larger as the traveling speed is higher. For that reason, the tire centrifugal force changes according to the traveling speed of the vehicle. Therefore, the thresholds corresponding to the traveling speeds are set based on the tire centrifugal force so as to accurately extract the ground contact section corresponding to the traveling speed.

Figure 11:
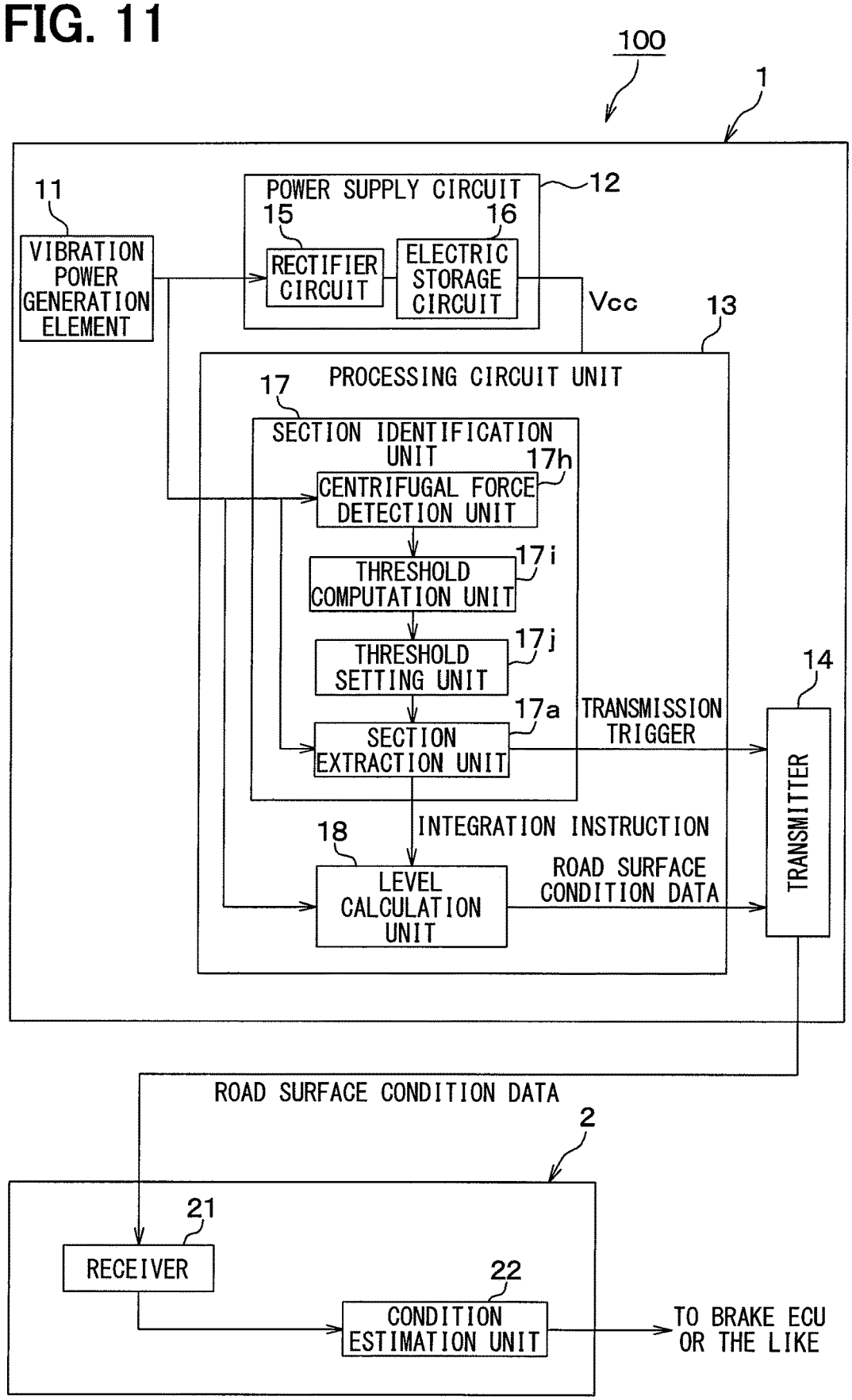
FIG. 11 is a diagram illustrating an overall block configuration of a road surface condition estimation device according to a fourth embodiment.

Specifically, in the present embodiment, as shown in FIG. 11, a section identification unit 17 is configured to include a centrifugal force detection unit 17h, a threshold computation unit 17i, and a threshold setting unit 17j in addition to a section extraction unit 17a.

The centrifugal force detection unit 17h detects the centrifugal force acting on a vibration detection and power generation unit 11. For example, the vibration detection and power generation unit 11 is provided with an acceleration sensor capable of detecting the centrifugal force, and the centrifugal force detection unit 17h can detect the centrifugal force acting on the vibration detection power generation unit 11 with the use of the detection signal of the acceleration sensor.

The threshold computation unit 17f calculates the first threshold and the second threshold based on the centrifugal force detected by the centrifugal force detection unit 17. The centrifugal force is varied according to the traveling speed, and the centrifugal force becomes smaller as the traveling speed of the vehicle is lower and becomes larger as the traveling speed of the vehicle is higher.

For that reason, in the present embodiment, the first threshold and the second threshold are changed according to the centrifugal force during the previous tire rotation into values following the traveling speed of the vehicle. Specifically, the first threshold and the second threshold are variably set in the following manner.

As for the first threshold, an initial value is set, and the initial value is corrected to set a new first threshold. The initial value is set to a threshold at a lowest traveling speed to be sensed. For example, the first threshold is set to be smaller as the centrifugal force during the previous tire rotation becomes smaller, and is set to be larger as the centrifugal force becomes larger. For example, the first threshold is decreased or increased by a value obtained by multiplying a difference between the previous and current centrifugal forces by a predetermined coefficient.

As for the second threshold, an initial value is set, and the initial value is corrected to set a new second threshold. The initial value is set to a threshold at a lowest traveling speed to be sensed. The second threshold is set to be smaller than the first threshold, and for example, the second threshold is set to be larger as the centrifugal force during the previous tire rotation becomes smaller, and is set to be smaller as the centrifugal force becomes larger. For example, the second threshold is decreased or increased by a value obtained by multiplying a difference between the centrifugal forces during the previous and current tire rotations by a predetermined coefficient.

In this manner, the first threshold and the second threshold are variably set based on the centrifugal force during the previous tire rotation. As a result, even if the pulse level of the output voltage of the vibration power generation element 11 changes according to the traveling speed of the vehicle, the first threshold and the second threshold can be set according to the change. Therefore, the ground contact section is determined according to the first threshold and the second threshold described above, thereby being capable of performing the determination with high accuracy.

As described above, the first threshold and the second threshold can be variably set based on the centrifugal force during the previous tire rotation. Even with the above manner, the same advantages as those in the first embodiment can be obtained.

Other Embodiments

Although the present disclosure has been described in accordance with the embodiments described above, the present disclosure is not limited to the above embodiments, but encompasses various modifications and modifications within the equivalent scope. In addition, it should be understood that various combinations or aspects, or other combinations or aspects, in which only one element, one or more elements, or one or less elements are added to the various combinations or aspects, also fall within the scope or technical idea of the present disclosure.

For example, the peak value detection unit 17b may store the peak value of the output voltage of the vibration power generation element 11 during the previous tire rotation. Alternatively, the peak value detection unit 17b can store the peak values of the output voltage of the vibration power generation element 11 for several past rotations including the previous tire rotation. In that case, the peak value detection unit 17b may obtain an average value of the peak values of the output voltage of the vibration power generation element 11 for several tire rotations, compare the average value with the peak value of the output voltage of the vibration power generation element 11 during the current tire rotation, and set the first threshold and the second threshold. Likewise, the pulse interval detection unit 17e may store the ground contact pulse interval during the previous tire rotation, but can store the ground contact pulse intervals for several past tire rotations including the previous tire rotation. In that case, the pulse interval detection unit 17e may obtain an average value of the ground contact pulse intervals for several tire rotations, compare the average value with the current ground contact pulse, and set the first threshold and the second threshold.

In addition, in the above embodiments, the integrated voltage value transmitted from the tire side device 1 is compared with a constant determination threshold in the vehicle side device 2 to estimate the road surface condition. Alternatively, the determination threshold may be variable. For example, the vibration generated in the tire 3 is changed according to the vehicle speed, and the vibration generated in the tire 3 becomes larger as the vehicle speed is higher even in the same road surface condition. For that reason, the high frequency component included in the detection signal of the vibration power generation element 11 also becomes larger as the vehicle speed is larger, and the integrated voltage value charged in the capacitor 183a also becomes larger. Therefore, for example, the vehicle speed data is input to the road surface condition estimation unit 22, and the determination threshold can be changed to a larger value as the vehicle speed indicated by the vehicle speed data is larger. The vehicle speed data calculated by a vehicle ECU (that is, electronic control device) based on the detection signal from, for example, a vehicle speed sensor or a wheel speed sensor may be acquired through a CAN communication.

Further, in the above embodiments, the ground contact pulse detection unit 171 extracts the high frequency components of the detection signal of the vibration power generation element 11 in a period of from the ground contact start time to the ground contact end time of the vibration power generation element 11, that is, in a period where the vibration power generation element 11 is in the ground contact section, and charges the capacitor 183a with the high frequency component to obtain the integrated voltage value. However, the above configuration is an example of the charging time when obtaining the integrated voltage value, and, for example, a constant time from the ground contact start of the vibration power generation element 11 may be set as the charging time when obtaining the integrated voltage value. For example, a time assumed as a ground contact time of the vibration power generation element 11 when the vehicle travels at a speed of 60 km/h can be set as the charging time. In that case, when the vehicle travels at the speed of 60 km/h or higher, a period during which the vibration power generation element 11 is located except for the ground contact section during the charging time is present, and the capacitor 183a is charged with the high frequency component of the detection signal of the vibration power generation element 11 even during that period. Therefore, in that case, it is preferable that the road surface condition estimation is not performed when the vehicle speed data is input, and the charging time exceeds the velocity speed assumed as the ground contact time of the vibration power generation element 11.

Further, in the third embodiment, when the ground contact pulse interval is used as a value corresponding to the traveling speed of the vehicle, a period presumed not to be the ground contact section is estimated from the ground contact pulse interval. This concept can also be applied to other values used as values corresponding to the traveling speed of the vehicle. For example, the period assumed to be not the ground contact section is estimated based on the maximum value or the minimum value of the pulse waveform described in the first embodiment. Similarly, a period assumed to be not the ground contact section can be estimated based on the centrifugal force described in the fourth embodiment. Even when the period assumed to be not the ground contact section is estimated based on those values, even if the pulse waveform becomes larger than the first threshold value or becomes smaller than the second threshold value during the period assumed not to be the contact section, the ground contact start time and the ground contact end time are not determined. This makes it possible to more accurately set the first threshold and the second threshold. Moreover, the ground contact section is precisely recognized, thereby being capable of detecting the road surface condition with higher accuracy.

What is claimed is:

1. A road surface condition estimation device provided in a vehicle, comprising:
    a tire side device that includes
        a vibration detection unit which is attached to a rear surface of a tread of a tire provided in the vehicle and which outputs a detection signal corresponding to a magnitude of vibration of the tire,
        a signal processing unit having
            a section identification unit which identifies a ground contact section in which a portion of the tread corresponding to a placement location of the vibration detection unit contacts the road during one rotation of the tire, and
            a level calculation unit which calculates a level of a high frequency component of the detection signal in the ground contact section, and
        a transmitter which transmits a calculation result of the level of the high frequency component as road surface condition data representing a road surface condition; and
    a vehicle side device that includes
        a receiver that receives the road surface condition data transmitted from the transmitter, and
        a road surface condition estimation unit that estimates a road surface condition of a traveling road surface of the tire based on the road surface condition data, wherein
    the section identification unit includes
        a threshold setting unit that sets, according to a traveling speed of the vehicle, a first threshold and a second threshold for comparison with a pulse level of a pulse waveform indicated by the detection signal, the second threshold being smaller than the first threshold, and
        a section extraction unit that extracts a period between a ground contact start time to a ground contact end time as a ground contact section, the ground contact start time being defined as a next maximum value of the pulse waveform indicated by the detection signal after the pulse waveform becomes larger than the first threshold, and the ground contact end time being defined as a next minimum value of the pulse waveform after the pulse waveform becomes smaller than the second threshold.

2. The road surface condition estimation device according to claim 1, wherein
    the section identification unit includes a peak value detection unit that detects a maximum value and a minimum value of the pulse waveform as values corresponding to the traveling speed of the vehicle, and that stores the maximum value and the minimum value of a previous rotation of the tire as a previous first peak value and a previous second peak value, respectively, and
    the threshold setting unit
        changes the first threshold to a value larger than that of the previous one rotation if the maximum value during the current rotation of the tire is larger than the first peak value, and changes the first threshold to a value smaller than that of the previous one rotation if the maximum value during the current rotation of the tire is smaller than the first peak value, and
        changes the second threshold to a value smaller than that of the previous one rotation if the minimum value during the current rotation of the tire is smaller than the second peak value, and changes the second threshold to a value larger than that of the previous one rotation if the minimum value during the current rotation of the tire is larger than the second peak value.

3. The road surface condition estimation device according to claim 2, wherein
    the threshold setting unit changes the first threshold to a value larger than that of the previous one rotation and changes the second threshold to a value smaller than that of the previous one rotation only if the maximum value during the current rotation of the tire is larger than the first peak value while the minimum value during the current rotation of the tire is smaller than the second peak value, and
    the threshold setting unit changes the first threshold to a value smaller than that of the previous one rotation and changes the second threshold to a value larger than that during the previous one rotation only if the maximum value during the current rotation of the tire is smaller than the first peak value while the minimum value during the current rotation of the tire is larger than the second peak value.

4. The road surface condition estimation device according to claim 1, wherein
    the section identification unit includes a pulse interval detection unit that detects a maximum value and a minimum value of the pulse waveform as values corresponding to the traveling speed of the vehicle, sets a time interval between reaching the maximum value and reaching the minimum value during one rotation of the tire as a ground contact pulse interval, and stores the ground contact pulse interval of previous one rotation of the tire, and
    the threshold setting unit
        changes the first threshold to a value larger than that of the previous one rotation and changes the second threshold to a value smaller than that of the previous one rotation if the ground contact pulse interval during the current rotation of the tire is shorter than the ground contact pulse interval of the previous one rotation, and
        changes the first threshold to a value smaller than that of the previous one rotation and changes the second threshold to a value larger than that of the previous one rotation if the ground contact pulse interval during the current rotation of the tire is longer than the ground contact pulse interval of the previous one rotation.

5. The road surface condition estimation device according to claim 2, wherein
the section identification unit includes a pulse interval detection unit that detects a maximum value and a minimum value of the pulse waveform as values corresponding to the traveling speed of the vehicle, sets a time interval between reaching the maximum value and reaching the minimum value during one rotation of the tire as a ground contact pulse interval, and stores the ground contact pulse interval of previous one rotation of the tire,
the threshold setting unit changes the first threshold to a value larger than that of the previous one rotation and changes the second threshold to a value smaller than that of the previous one rotation only if the maximum value during the current rotation of the tire is larger than the first peak value, the minimum value during the current rotation of the tire is smaller than the second peak value, and the ground contact pulse interval during the current rotation of the tire is shorter than the ground contact pulse interval of the previous one rotation, and
the threshold setting unit changes the first threshold to a value smaller than that of the previous one rotation and changes the second threshold to a value larger than that of the previous one rotation only if the maximum value during the current rotation of the tire is smaller than the first peak value, the minimum value during the current rotation of the tire is larger than the second peak value, and the ground contact pulse interval during the current rotation of the tire is longer than the ground contact pulse interval of the previous one rotation.

6. The road surface condition estimation device according to claim 1, wherein
the section identification unit includes a centrifugal force detection unit that detects a centrifugal force of the tire acting on the tire side device as a value corresponding to the traveling speed of the vehicle,
the threshold setting unit changes the first threshold to a value larger than that of a previous one rotation of the tire and changes the second threshold to a value smaller than that of the previous one rotation if the centrifugal force during the current rotation of the tire is larger than the centrifugal force during the rotation of the tire of the previous one rotation, and
the threshold setting unit changes the first threshold to a value smaller than that of the previous one rotation and changes the second threshold to a value larger than that of the previous one rotation if the centrifugal force during the current rotation of the tire is smaller than the centrifugal force during the rotation of the tire of the previous one rotation.

7. The road surface condition estimation device according to claim 1, wherein
the section extraction unit
estimates a period assumed not to be the ground contact section based on a value corresponding to the traveling speed of the vehicle,
performs no determination of the ground contact start time during the period assumed not to be the ground contact section even if the pulse waveform indicated by the detection signal is larger than the first threshold, and
performs no determination of the ground contact end time even during the period assumed not to be the ground contact section if the pulse waveform is smaller than the second threshold.

8. A system for estimating road surface conditions, comprising:
a first processor configured to be coupled to a vibration detection unit which is attached to a rear surface of a tread of a tire provided in the vehicle and which outputs a detection signal corresponding to a magnitude of vibration of the tire, the first processor including circuitry configured to:
identify a ground contact section in which a portion of the tread corresponding to a placement location of the vibration detection unit contacts the road during one rotation of the tire,
calculate a level of a high frequency component of the detection signal in the ground contact section, and
output a calculation result of the level of the high frequency component as road surface condition data representing a road surface condition; and
a second processor coupled to the first processor, the second processor including circuitry configured to:
receive the road surface condition data output from the first processor, and
estimate a road surface condition of a traveling road surface of the tire based on the road surface condition data, wherein
the first processor further includes circuitry configured to:
set, according to a traveling speed of the vehicle, a first threshold and a second threshold for comparison with a pulse level of a pulse waveform indicated by the detection signal, the second threshold being smaller than the first threshold, and
extract a period between a ground contact start time to a ground contact end time as a ground contact section, the ground contact start time being defined as a next maximum value of the pulse waveform indicated by the detection signal after the pulse waveform becomes larger than the first threshold, and the ground contact end time being defined as a next minimum value of the pulse waveform after the pulse waveform becomes smaller than the second threshold.

* * * * *